United States Patent
Pryor et al.

[11] 3,943,818
[45] Mar. 16, 1976

[54] RAILROAD TIE

[76] Inventors: Roy R. Pryor; Harold A. Pryor, both of P.O. Box 26, Woodville, Tex. 75979

[22] Filed: Feb. 7, 1974

[21] Appl. No.: 440,474

Related U.S. Application Data

[62] Division of Ser. No. 179,719, Sept. 13, 1971, Pat. No. 3,813,038.

[52] U.S. Cl. ............ 85/42; 403/296; 238/37
[51] Int. Cl.² ........................................ F16B 23/00
[58] Field of Search ........... 238/37; 85/1 L, 1 R, 42; 403/43, 296, 344, 313; 285/239, 397; 29/105

[56] References Cited
UNITED STATES PATENTS

| | | | |
|---|---|---|---|
| 313,193 | 3/1885 | Gaylord | 85/42 |
| 571,042 | 11/1896 | Edquist | 85/42 |
| 928,237 | 7/1909 | Baird | 285/239 |
| 1,001,333 | 8/1911 | Andrew | 238/37 |
| 1,047,876 | 12/1912 | Andrew | 238/37 |
| 1,251,086 | 12/1917 | Morgan | 403/296 |
| 1,610,934 | 12/1926 | Delany | 85/42 |
| 2,584,723 | 2/1952 | Mackey | 85/1 L |
| 2,699,182 | 1/1955 | Bladridge, Jr. | 403/296 |
| 3,242,553 | 3/1966 | Bodgsten | 29/105 |
| 3,497,890 | 3/1970 | Coyle | 85/1 L |
| 3,552,257 | 1/1971 | Tanabe | 85/1 L |

*Primary Examiner*—Robert R. Song
*Assistant Examiner*—Richard A. Bertsch

[57] ABSTRACT

An improved railroad tie member is formed of two wooden half-ties which are secured together with one or more reverse threaded bolts arranged in parallel with the tracks. The bolts are preferably inserted in the tie halves whereby the bolts may be turned to resecure the two halves while the tie assembly is installed in the track.

11 Claims, 14 Drawing Figures

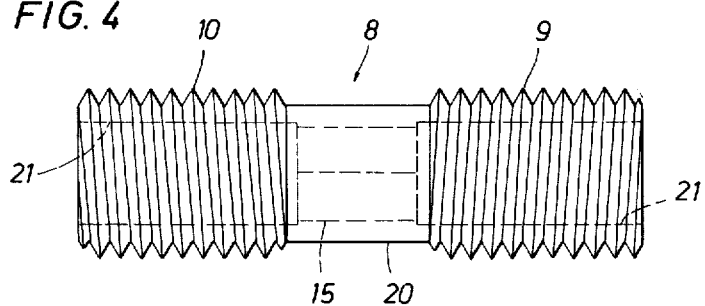
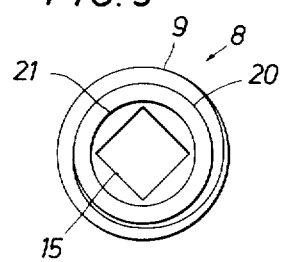
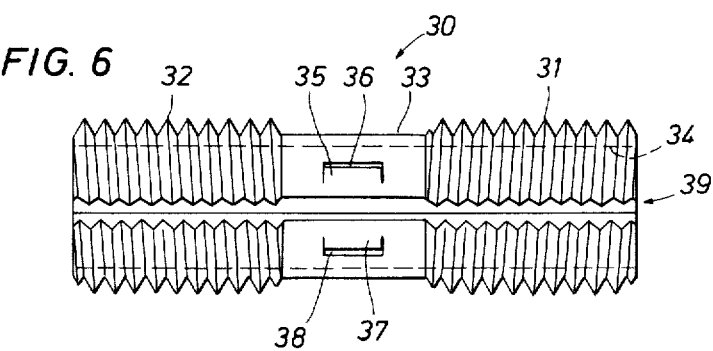
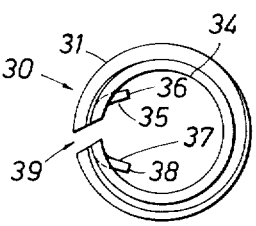
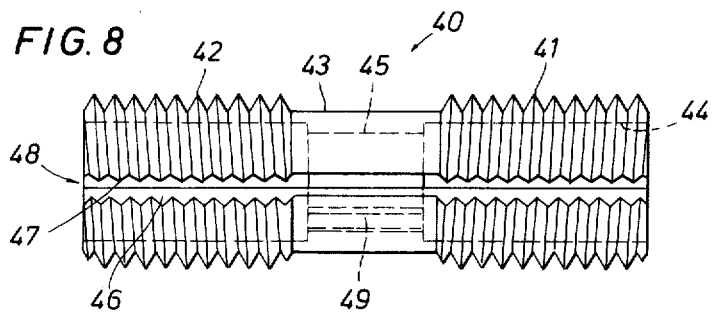
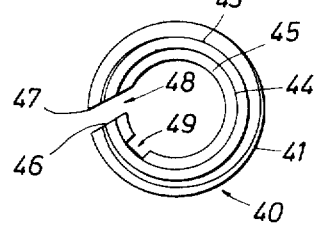
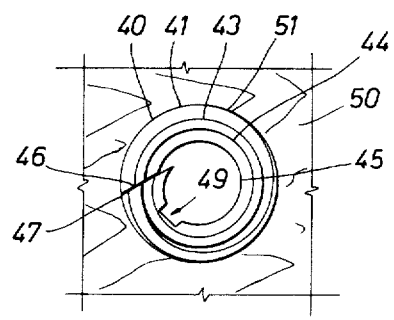

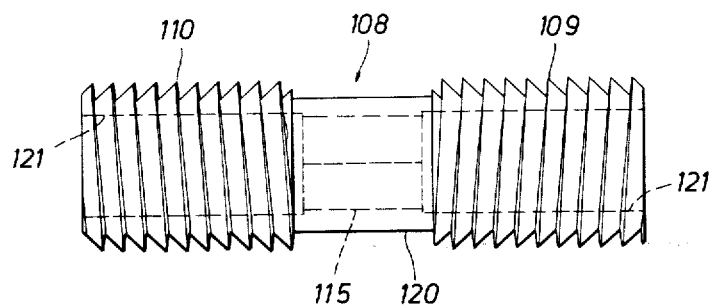
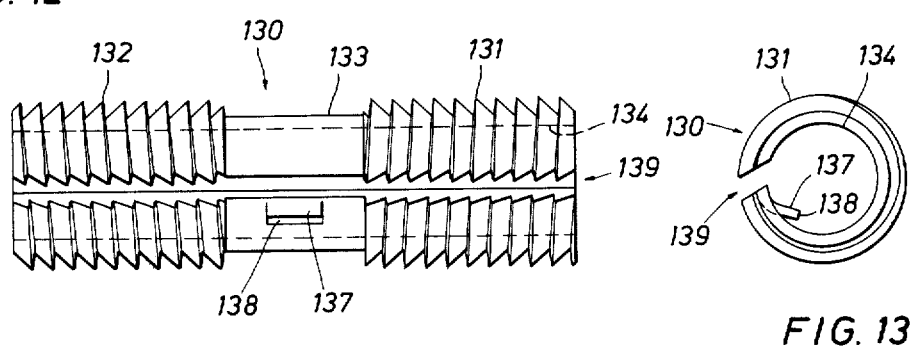
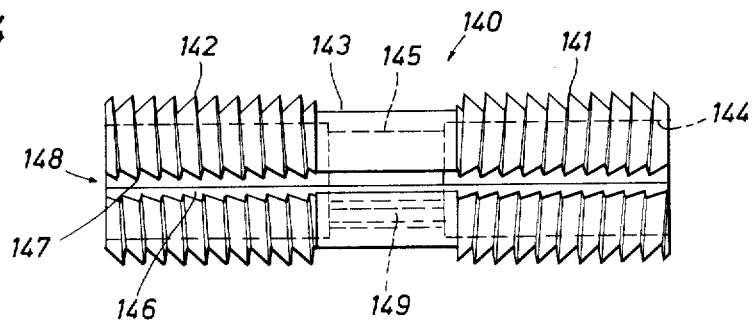

RAILROAD TIE

This application is a division of our copending application, Ser. No. 179,719, filed Sept. 13, 1971, for "Improved Railroad Tie" and issued May 28, 1974 as U.S. Pat. No. 3,813,038.

BACKGROUND OF INVENTION

This invention relates to improved methods and apparatus for securing together a plurality of strength members and, more particularly, relates to improved methods and apparatus for fastening together two wooden timbers or the like. In a specific embodiment of the present invention, an improved assembly of such timbers is provided which are especially suitable for use as a railroad tie or the like.

It is well known that wood is an especially suitable material insofar as structural purposes are concerned, not only because of obvious factors such as cost, ease of fabrication, strength and rigidity, etc., but also because of its relatively long useful life. In other words, the cellular character of wood does not render a wooden beam subject to failure because of fatigue, whereas the same unfortunately cannot be said for even the best of steels. Accordingly, wood is still very much preferred over other substances in the manufacture of many types of strength members wherein the penalty for sudden failure may be unacceptable.

For example, it is well known that most railroad ties are still made of wood, notwithstanding the present availability of many other apparently better materials and notwithstanding the fact that the cost of wood has increased to a substantial extent. Nevertheless, there are a great many miles of railroad in the United States and throughout the world, and although the average useful life of a wooden railroad tie is surprisingly good, it is nonetheless the case that a great many replacement ties are required each year. Accordingly, the cost of each railroad tie (including the tie-in-place, as well as the tie intended as a replacement) is a significant cost factor in the operation of any railroad systems.

It is well known, however, that most railroad systems in the United States employ heavier rolling stock than is commonly used throughout other portions of the world. This, in turn, increases the cost of tie installation and replacement in the United States, since more substantial trackage is a concomitant requirement of heavier rolling stock. Furthermore, the trend is to larger, and therefore even heavier, rolling stock in the United States. Accordingly, this tends to increase the demand for more substantial (i.e., stronger) ties.

It will be obvious that since wood is usually sold on a "board foot" basis, a larger railroad tie will necessarily cost more than a smaller tie. What is not well known, however, is that since a tie is conventionally fabricated as a single unit, an increase in tie size necessarily produces a resulting decrease in the number of trees (saw logs) which are large enough for such purposes, and this in turn produces an abnormal increase in the cost of fabricating a wooden railroad tie.

Although there is some variation in the size of ties used in trackage in the United States, most ties are 8–9 inches wide and 6–7 inches thick, depending on factors such as the intended use of the trackage and the special need of the particular railroad involved. For example, all ties must be 7 inches thick or greater unless the tie is to be used for a siding or the like, whereupon it may be only 6 inches thick. Whether an 8-inch wide tie is acceptable depends upon the weight which the tie may be expected to bear and upon the character of the road bed.

A tie which is expected to be used in a mainline track may be between 8 and 9 feet long, also depending on the character of the road bed. On the other hand, a tie which is to be installed at a switch may be 16 feet long or even longer.

All ties are treated with preservative, since the ties which are installed in sidings are as subject to deteriorations from insect attack and the like, as are ties in a mainline track. On the other hand, the ties in sidings are expected to have a much longer useful life since they are rarely subjected to an impact of the same magnitude as will be felt by a main track tie each time a train passes over at a high velocity. Accordingly, only a small number of the 6-inch thick ties are required each year, just as only a relatively small number of extra-long ties are required for switch installation or replacement. Instead, the great bulk of all wooden railroad ties which are now purchased or fabricated in the United States will be within the following schedule of dimensions:

| Width | Thickness | Length |
|-------|-----------|--------|
| 8"    | 7"        | 8', 8½' or 9' |
| 9"    | 7"        | 8', 8½' or 9' |

It will be readily apparent that only a relatively large and therefore more expensive saw log is suitable for fashioning a railroad tie of these dimensions. Accordingly, it will readily be apparent why there has long been a demand for a way to fashion an acceptable railroad tie out of two or more separate pieces of smaller size.

It is old, of course, to join two pieces of wood together for the purpose of providing a single piece of larger size. Accordingly, it is concededly old to glue, nail or otherwise fasten together two smaller wooden boards or beam to form a single large beam. Accordingly, many attempts have been made to form a less expensive railroad tie out of two or more smaller and therefore cheaper pieces of wood. The problem is that a railroad tie is subjected to a massive impact each time a piece of rolling stock passes over at a high enough speed. Furthermore, the impact tends to be delivered tangentially to the tie, which increases the likelihood that the tie will be split.

Attempts have been made to glue two tie-halves together to form a tie which will endure this shock. A railroad tie is conventionally treated with a preservative such as creosote, however, and this treatment tends to adversely affect the stability of the bond which is sought to be formed. Moreover, the two tie-halves are not identical insofar as grain and cell formation characteristics are concerned, and if one half tends to yield to the impact to a different extent, this also tends to break the bond between the two halves.

Nail-type joints are obviously less secure than conventional glue joints between two pieces of wood. Nevertheless, various complex techniques such as that described in U.S. Pat. No. 985,470 have been proposed from time to time which were intended to react in a compensatory way to the type of shock to which a railroad tie is subjected when a train passes over at a high speed. No such nail-type technique has ever been found to be satisfactory for such purposes. There has long been a demand for a commercially acceptable railroad tie which is formed out of two separate pieces, however, as is indicated by the many attempts to provide such a product. For example, see U.S. Pat. No. 197,721 which issued Dec. 4, 1877; U.S. Pat. No. 875,856 (Jan. 7, 1908); U.S. Pat. No. 985,470 (Feb. 28, 1911); U.S. Pat. No. 1,166,673 (Jan. 4, 1916); U.S. Pat. No. 1,436,573 (Nov. 21, 1922); and U.S. Pat. No. 2,701,399 (Feb. 8, 1955). Notwithstanding the fact that this long-existing demand has recently grown more acute, however, all of these prior art methods and apparatus have so far proved unsuccessful.

SUMMARY OF THE INVENTION

As will hereinafter be explained in detail, a suitable railroad tie which is 9 inches wide, 8 inches thick, and 9 feet long may be formed by fastening together two pieces each 4½ inches wide × 8 inches thick × 9 feet long in a side-by-side manner. In a preferred form of the present invention, each tie-half is provided with three equally spaced-apart drill holes located so as to be parallel with the two rails to be supported. Further, the drill holes in one tie-half are preferably located so as to align with corresponding drill holes in the other tie-half.

The two tie-halves are preferably secured together by a metal bolt or sleeve-like member having right-hand external threads about one end and having left-hand external threads about the other end. The sleeve member is also preferably split along its length and provided with a resilient capability. Accordingly, the sleeve is preferably arranged with each end at least partially inserted in a drill hole in one of the two tie-halves, whereby rotation of the sleeve in the proper direction will draw the two tie-halves into unitary conjunction with each other. The sleeve may have an internally located lug or stop portion, whereby a suitably designed wrench member may be inserted through the hole in the tie-half from the opposite side until it penetrates the sleeve. Thereafter, the wrench may be turned until it engages the lug or stop means and thereby rotates the sleeve to draw the tie-halves together.

The sleeve is preferably resilient in character, and especially insofar as it may be compressed into the drill holes in the two tie-halves. Accordingly, even though the tie-halves may subsequently shrink from dessication, the sleeve will expand to remain snugly fitted in the tie halves.

It is well known that when a wooden railroad tie is treated with creosote or other preservative in a conventional manner, the creosote cannot usually penetrate more than a limited distance into the wood. Since penetration is always from an external surface, it will be readily apparent that if the tie is formed of two tie-halves, and if the halves are treated before being joined together, the interior of the resulting tie will be treated to a much greater extent than will ever be the case with a tie which is formed as a single unit from a single saw log. On the other hand, the character of a wooden tie is substantially altered after such treatment, and thus it is difficult to join together two pretreated tie-halves.

In a preferred embodiment of the present invention, the sleeve is inserted into the sides of two tie-halves before they are treated, and then the two halves are brought into close proximity to each other. However, a space of about one inch is preferably permitted to remain between the two tie halves while the assembly is subjected to treatment. After treatment, the sleeve may then be rotated to finish drawing the two halves tightly together.

As will hereafter become apparent, it is a feature of the present invention to provide a novel railroad tie assembly which is substantially cheaper to make and which also has a substantially greater useful life.

Even if the tie-halves tend to shrink with age and to draw apart after being installed in the trackage, the wrench may be inserted into the fastener and rotated so as to tighten the assembly without the necessity of having to remove the tie from the trackage. Accordingly, to this extent it is a feature of the present invention to provide a railroad tie which may be repaired in situ.

As will also be apparent, the fastener which may be used for the purpose of making the railroad tie described herein may be any of several types. However, a novel fastener is also provided which is a particular feature of the present invention.

These and other features and advantages of the present invention will be apparent from the following detailed description, wherein reference is made to the figures in the accompanying drawings.

IN THE DRAWINGS

FIG. 4 is a more detailed illustration of another portion of the apparatus depicted only generally in FIGS. 1–3.

FIG. 5 is another different view of the apparatus depicted in FIG. 4.

FIG. 6 is a detailed pictorial representation of another embodiment of the apparatus depicted in FIGS. 4 and 5.

FIG. 7 is another view of the apparatus illustrated in FIG. 6.

FIG. 8 is a detailed pictorial representation of a further different embodiment of the apparatus depicted in FIGS. 4–7.

FIG. 9 is another view of the apparatus illustrated in FIG. 8.

FIG. 10 is another different pictorial representation of the apparatus depicted in FIG. 9.

FIG. 11 is a pictorial representation of a modified form of the fastener depicted in FIGS. 4 and 5.

FIG. 12 is a pictorial representation of a modified form of the fastener depicted in FIG. 6.

FIG. 13 is an end view of the fastener depicted in FIG. 12.

FIG. 14 is a pictorial representation of a modified form of the fastener depicted in FIG. 8.

DETAILED DESCRIPTION

Figure 1:
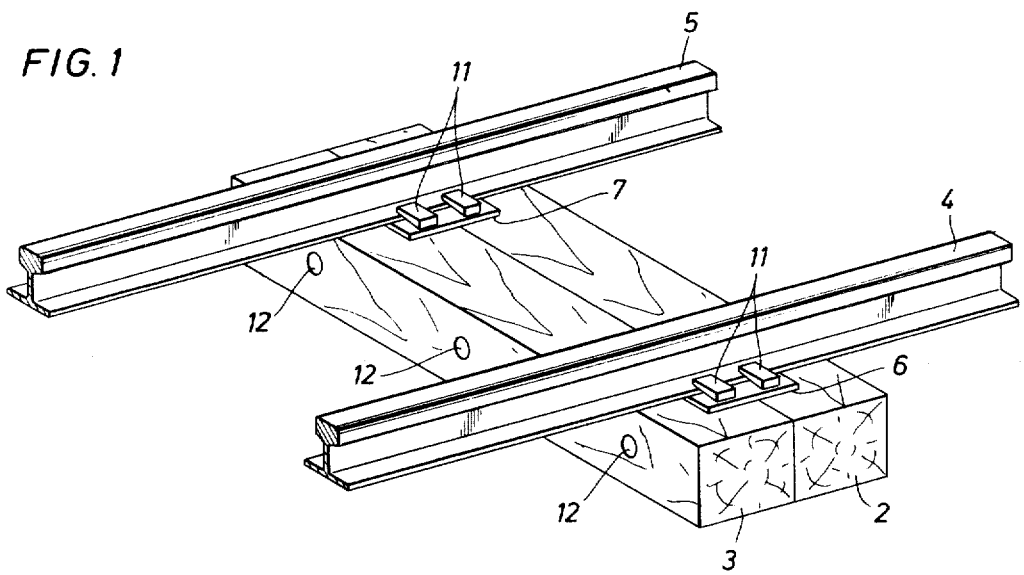
FIG. 1 is a pictorial representation of the major components in a section of railroad trackage containing an exemplary embodiment of the present invention.

Referring now to FIG. 1, there may be seen a pictorial representation of a section of railroad trackage containing an exemplary embodiment of the present invention. In particular, there is included a pair of wooden half-ties 2 and 3 arranged in abutting side-by-side relationship to form a single whole tie for supporting a pair of conventional steel railroad rails 4 and 5.

More particularly, the rails 4 and 5 are positioned on steel pads 6 and 7 and are fixedly secured thereto by the grip of broad-headed spikes 11 driven appropriately into the tie-halves 2 and 3 through apertures in the pads 6 and 7.

It is customary to employ four spikes (two on each side) for securing a rail to a conventional "single-unit" tie. Accordingly, it will be noted that the rails 4 and 5 depicted in FIG. 1 are also each preferably secured to the two tie-halves 2 and 3 by four spikes 11 of conventional design. However, it should also be noted that of the two spikes 11 which are located on each side of each of the two rails 4 and 5, only one spike 11 (on each side) is preferably driven into each of the two tie-halves 2 and 3.

Referring again to FIG. 1, it should be further noted that it is not essential that the two tie-halves 2 and 3 be identical in size and shape, but only that the two "halves" 2 and 3 be of such size and shape that, when arranged in side-by-side relationship, they form an assembled tie of the proper size and shape. If the tie sought to be replaced or duplicated is 9 inches wide, 7 inches high (or thick), and 9 feet long, then each tie may conveniently be 9 feet long and 7 inches high, but only 4½ inches wide.

Figure 2:
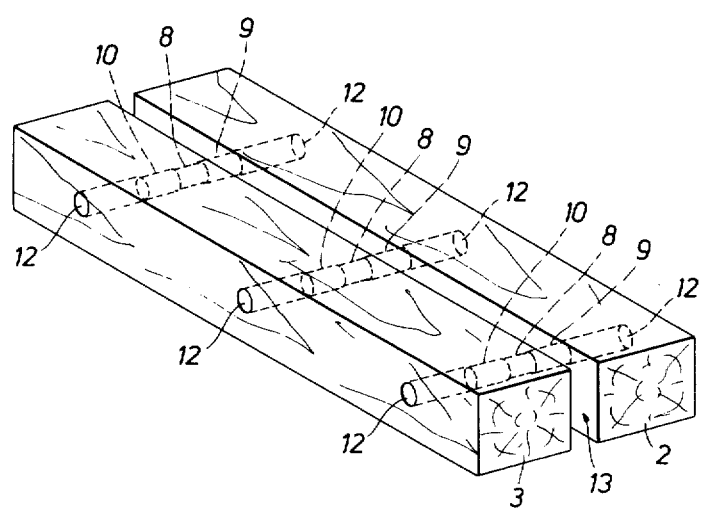
FIG. 2 is a simplified pictorial representation of a portion of the apparatus depicted in FIG. 1.
Figure 3:
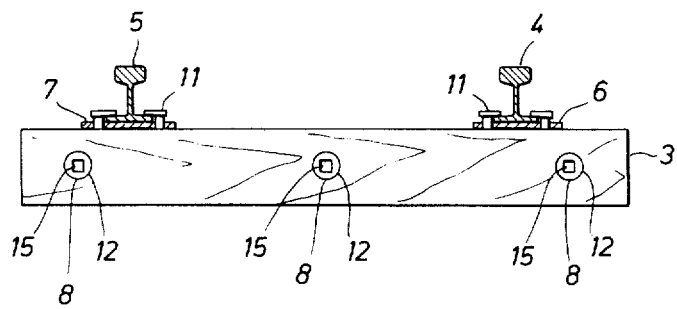
FIG. 3 is another different view of the apparatus depicted pictorially in FIG. 1.

Referring now to FIGS. 2 and 3, therefore, it may be seen that the two tie-halves 2 and 3 are preferably provided with one or more drill holes 12 which, as indicated in FIG. 2, extend transversely through the two halves 2 and 3 in parallel with the rails 4 and 5, and which are preferably located generally midway between the top and bottom surfaces of the two halves 2 and 3. Further, the drill holes 12 in each of the two tie-halves 2 and 3 are suitably alignable with corresponding holes 12 in the other of the two tie-halves 2 and 3, whereby a tie-bolt 8 may be installed in at least one of the drill holes 12 in each of the two tie-halves 2 and 3.

More particularly, and as further indicated in FIG. 4, the tie-bolt 8 is preferably a hollow pin-like member having right-hand threads 9 at one end and left-hand threads 10 at the other. In addition, the inside center portion of the bolt 8 is preferably fashioned in the manner of some straight-sided polygon such as a hexagon or square, to form a socket 15 to receive a suitably shaped "Allen-type" wrench (not depicted). Accordingly, it will be apparent that the wrench may be thrust into one of two aligned holes 12 and into the socket 15 of the bolt 8 which is installed therein, and if the bolt 8 is rotated in the proper direction the two tie-halves 2 and 3 may be drawn together, as indicated in FIG. 1, even after the two tie-halves 2 and 3 have been installed in trackage. Alternatively, the bolt 8 may also be rotated in the opposite direction if it is desired to spread the two halves 2 and 3 apart for any reason.

The length of the bolt 8 is not a particular feature of the present invention, but it will be apparent that it is necessary for the threaded ends 9 and 10 to be long enough to obtain a sufficient "bite" into the particular one of the two tie-halves 2 and 3 into which they may be inserted. Accordingly, it will be apparent from FIGS. 1-3 that the overall length of the bolt 8 may conveniently be on the order of the width of one of the two tie-halves 2 and 3, so that when the two halves 2 and 3 are joined together to support the rails 4 and 5, as illustrated in FIG. 1, the bolt 8 will extend about half-way into each of the two tie-halves 2 and 3.

As hereinbefore stated, at least one bolt 8 must be provided in order to secure the two tie-halves 2 and 3 together. In such a case, the drill holes 12 containing this solitary bolt 8 are preferably located substantially midway between the ends of the two tie-halves 2 and 3.

On the other hand, if two or more drill holes 12 are provided in each of the two tie-halves 2 and 3, as suggested in FIGS. 1-3, then the outside two drill holes 12 are each preferably located midway between the adjacent end of the ties 2 and 3 and the adjacent one of the two rails 4 and 5, as in FIG. 3. If it is sought to provide an assembled tie of conventional size and shape, each of the two rails 4 and 5 will be located about eighteen inches from the ends of the tie-halves 2 and 3, and thus each of the two outside holes 12 will be preferably located about nine inches from the end of the halves 2 and 3.

Referring again to FIGS. 1-3, it will be seen that if the tie-halves 2 and 3 are of a standard size, there are preferably three drill holes 12 provided in each of the two halves 2 and 3. As further indicated, a tie-bolt 8 is preferably inserted in at least the two outside drill holes 12.

As hereinbefore stated, wooden railroad ties must be treated with a preservative such as creosote in order to retard their deterioration. The various techniques by which the ties are treated are beyond the scope of the discussion. It is significant, however, that the creosote or other preservative is usually applied to the exterior of the ties and is thus absorbed to a varying degree. The ties are conventionally cut so that the grain of the wood almost always generally parallels the length of the tie.

The creosote will tend to penetrate into the ends of the ties to a considerable extent. However, only a limited degree of penetration or absorption can usually be obtained transversely of the grain of the wood (i.e., into the sides, top or bottom of the tie). Sometimes only about 30 percent of the average railroad tie of conventioinal design is actually treated in an effective manner. Consequently, if the tie splits or is otherwise damaged in some manner after it is treated, but before it is installed, the split or fissure may open the untreated interior of the tie to attack by the elements.

It has long been desired to treat a greater percent of the tie with creosote, and thus elaborate systems and techniques have been proposed and developed for literally forcing the creosote further into the wood by the use of heavy pressures. None of these techniques has proved especially practical, and thus the conventional treatment is to simply immerse the ties in a creosote bath and to depend on the capillary structure of the wood cells to draw in the preservative.

Referring now to FIG. 2, however, there may be seen a pictorial representation of the tie assembly as it appears before creosoting and before installation. In particular, the two wooden tie-halves 2 and 3 have each been provided with three drill holes 12 at the appropriate locations, and in addition three tie-bolts 8 have been installed so that the ends having left-hand threads 9 are each partially inserted into the drill holes 12 in the tie-half 2, and so that the ends having right-hand threads 10 are each partially inserted into the drill holes 12 in the other tie-half 3. Thus, each of the three tie-bolts 8 may appropriately be rotated enough that the two tie-halves 2 and 3 are now securely coupled to each other, but only enough so that there is nevertheless a clear gap 13 therebetween.

Accordingly, it is a feature of the present invention that the tie-halves 2 and 3 are preferably arranged as illustrated in FIG. 2 before being subjected to any sort of creosote bath. Thus, the creosote will now be absorbed into the tie-halves 2 and from the two surfaces forming the gap 13, as well as through the other surfaces, and this is equivalent to inserting creosote into the center of a conventional tie at the same time it is bathed in creosote. It should also be noted that the portion of the drill holes 12 not occupied by a section of bolt 8 will also serve as an intake port for the creosote. For this reason, it will be clearly apparent that a railroad tie which is constructed according to the embodiment of the invention depicted in FIGS. 1–3 will absorb a much greater proportion of creosote — perhaps as much as eighty percent.

Any of several different types of bolts 8 may be employed in the drill holes 12 depicted in FIGS. 1-3. In particular, however, an especially suitable bolt 8 is generally depicted in U.S. Pat. No. 3,242,553, and specifically depicted in FIGS. 4 and 5 hereof. Accordingly, the bolt 8 may be seen to be provided with threaded end portions 9 and 10, as hereinbefore described, but also with a non-threaded central section 20 of a smaller outside diameter than the threads 9 and 10 to avoid binding in the drill hole 12. The interior of the central section 20 is preferably fashioned in a rectangular or other polygonal manner to form the socket 15, as hereinbefore explained. Since the tang of the Allen wrench (not depicted) must be thrust through the end of the bolt 8 to penetrate the socket 15, the inside 21 of the threaded portions 9 and 10 of the bolt 8 is preferably larger in cross-section or diameter than the socket 15.

Referring now to FIGS. 6 and 7, there may be seen another type of fastener which is especially suitable for securing the two tie-halves 2 and 3 together. In particular, there may be seen a sleeve bolt 30 having a generally cylindrical configuration but also being split longitudinallly to form a gap 39. The two ends 31 and 32 of the bolt 30 are also provided with left-hand and right-hand threads, respectively, with the threaded sections separated by a non-threaded center section 33 of slightly smaller outside diameter than the threaded ends 31 and 32. The inside surface 34 of this sleeve bolt 30 may be seen to be uniform in diameter and configuration throughout the length of the bolt 30, and thus no socket portion is provided with this type of fastener as in the tie-bolt 8 depicted in FIG. 4.

Referring again to FIGS. 6 and 7, however, there may be seen a flap-like rectangular portion of the center section 33 which is directed into the interior of the bolt 30 and which is hereinafter referred to as the flap 35. Similarly, an oppositely directed flap 37 may also be provided as indicated therein.

Another significant feature of the sleeve bolt 30 depicted in FIGS. 6 and 7 is that it is preferably resilient insofar as its cross-section is concerned, and that its edges which form the gap 39 are normally spread apart. When the bolt 30 is fitted into the drill hole 12 in a tie-half, however, the two oppositely beveled or slanted edges will tend to be pressed together, whereby the resilient character of the bolt 30 will reduce the possibility of slippage in the wood.

The purpose of the two flaps 35 and 37 is to provide means by which the sleeve bolt 30 may be rotated. As will be apparent, almost any form of tool may be used for this purpose if it can be inserted substantially non-rotatably into the center section 33 of the bolt 30. It is only necessary for the tool (note depicted) to have a surface capable of engaging either the abutting surface 36 of the flap 35 or the surface 38 of the flap 37 in a non-slipping manner when rotated in the desired direction.

Referring now to FIGS. 8 and 9, there may be seen another slotted or split sleeve bolt 40 which is also provided with a small-diameter center section 43 located midway between threaded end portions 41 and 42. However, it will also be noted that the inside 45 of the center section 43 is smaller than the inside 44 of the threaded end portions 41 and 42, and that the center section 43 is further provided with an interior keyway 49. Thus the tool (not depicted) which is suitable for the sleeve bolt 40 depicted in FIGS. 8 and 9 is preferably formed to be accommodated by the keyway 49.

As in the case of the bolt 30 depicted in FIGS. 6 and 7, it will be noted that the longitudinal edges 46 and 47 which form the gap 48 in the bolt 40 are also beveled or canted. Referring to FIG. 10, therefore, it will be seen that if the diameter of the hole 51 in a tie or other timber 50 is substantially smaller than the "normal" diameter of the sleeve bolt 40, the bolt 40 can nevertheless be squeezed into the hole 51, because the slanted edge 46 will tend to slide on and ride under the oppositely slanted opposing edge 47. Moreover, even if the wood 50 shrinks or otherwise changes shape, whereby a more conventional bolt 8 might become loosened, relaxation of the tension will merely allow the bolt 40 to expand to an equal and compensating extent.

Although reference has been made to the present invention throughout as a primarily improved railroad tie, it will be apparent from the foregoing that the invention may be equally used in other applications. In particular, bridge or trestle timbers for even the smaller bridges are necessarily on the order of 6 inches by 17 inches by 26 feet long. Southern pine is the preferred type of wood for this purpose, not only because of its inherent toughness and good nail-retention character, but also because of its ability to absorb creosote or the like without any apparent adverse effect. Unfortunately, most Southern pine trees are too small in cross-section to be capable of providing a timber of such size.

The white or ponderosa pine tree is usually large enough for such a purpose, but it is unsuitable because it is too soft. Accordingly, the sole source of bridge timbers has heretofore been fir trees and redwoods of the type common to the West coast of North America. Even this type of tree is not entirely satisfactory, however, since wood of this kind does not readily absorb creosote. Pressure-type methods can be used to increase penetration by the creosote, but this seems to adversely affect the tensile strength of the wood. Thus, it will be apparent that the present invention is equally suitable for making bridge timbers and the like. Accordingly, this will not only provide a new type of bridge timber which is better than that previously in use, but it will also increase the value of the average yellow pine now growing throughout the southeastern parts of the United States.

It will be apparent that an essential feature of the present invention is a fastener which is not only adjustable while the tie is installed in the trackage, but which will also more securely fasten the two tie-halves 2 and 3 together than those fastening devices heretofore sough to be used. Accordingly, it has been desirable to provide the tie bolts 8 hereinbefore described with buttress-type threads.

Referring now to FIG. 11, there may be seen a tie bolt 108 which is substantially similar in purpose and configuration to the tie bolt 8 depicted in FIGS. 4 and 5, in that it is also a sleeve-like member having oppositely-directed threads about the exterior ends, and a non-threaded center section 120 of relatively small diameter. Further, it will be noted that the tie bolt 108 is also provided with a centrally located internal socket section 115 for receiving a wrench (not depicted), that this socket section 115 is also rectangular in cross section, and that it is relatively smaller in diameter than the inside diameter 121 of each of the threaded end portions. Nevertheless, it must also be noted that the threads 109 and 110 for the tie bolt 108 differ in one respect from the threads 9 and 10 depicted in FIG. 4, in that the threads 109 and 110 are buttress-type in configuration. Furthermore, and equally important for the principal purposes of this invention, it will be noted that the buttress threads 109 and 110 are "faced" toward the center or socket section 115 of the tie bolt 108, whereby the threads 109 and 110 will exert maximum "bite" or gripping effect against slippage tending to disengage either end of the tie bolt 108 from either of the two tie havles 2 and 3.

Referring now to FIGS. 12 and 13, there may be seen a slotted sleeve bolt 130, which is substantially similar to the sleeve bolt 30 depicted in FIGS. 6 and 7, but which is provided with buttress threads on the end portions 131 and 132, rather than the threads on the end portions 31 and 32 of the sleeve bolt 30 depicted in FIGS. 6 and 7. More particularly, the bolt 130 may be seen to have a non-threaded center section 133 of relatively smaller external diameter, although the inside diameter 134 of the bolt 130 may be uniform throughout its length.

The sleeve bolt 130 depicted in FIGS. 12 and 13 will thus appear to have all of the substantial features of the sleeve bolt 30 illustrated in FIGS. 6 and 7. However, in the bolt 130 there is preferably provided only one flap 137 having an edge 138 positioned to receive the driving force of the wrench (not depicted) only when the wrench is rotated so as to embed the threaded ends 131 and 132 more deeply into the two tie halves 2 and 3, respectively. In other respects, the sleeve bolt 130 may be expected to function substantially the same as hereinbefore described with respect to the sleeve bolt 30. Thus, the bolt 130 is preferably given a resilient character insofar as lateral compression is concerned, and when the bolt 130 is rotated in a clockwise direction (see FIG. 13), the slot 139 will narrow and perhaps even close. The advantage of the resilient character of the sleeve bolt 130 is that the bolt 30 can be squeezed to permit it to be inserted more quickly and easily into the bolt hole 12, but that after it is installed, the bolt 130 will expand and firmly embed itself into the wood to thereby oppose being withdrawn.

Referring now to FIG. 14, there may be seen another slotted fastener embodying the concepts of the present invention, and resembling in many respects the slotted sleeve bolt 40 depicted in FIG. 8. Accordingly, the threaded end sections 141 and 142 of the sleeve bolt 140 are preferably provided with oppositely directed external buttress-type threads positioned to oppose withdrawal of the bolt 140. The inside diameter 145 of the socket or wrench portion or section 143 is preferably smaller than the inside diameter 144 of the threaded sections 141 and 142, and is further preferably provided with a keyway 149. It will thus be seen that when the driving portion or key of the wrench (not depicted) is inserted into the keyway 149, and is thereafter rotated to "screw" the threaded ends 141 and 142 of the bolt 140 into the tie halves 2 and 3, the slot 148 will tend to be closed. The bolt 140 is preferably resilient in character, as hereinbefore described with respect to the bolt 130 in FIGS. 12 and 13, and thus the bolt 140 tends to resist being squeezed into the drill hole 12 as hereinbefore explained. It should also be noted that the edges 146 and 147 are beveled oppositely of each other, so that the sleeve bolt 140 may be constricted before insertion into the drill hole 12, whereby the bolt 140 may be more quickly and easily installed in the tie halves 2 and 3. Thus, the "leading" edge 146 is beveled oppositely of the "trailing" edge 147, whereby the leading edge 146 will ride under the trailing edge 147 to facilitate constriction.

Various modifications and alterations may be made in the methods and apparatus hereinbefore described, and in the structures illustrated in the accompanying drawings. Accordingly, the methods and apparatus specifically described and depicted herein are included to be exemplary only and are not intended as limitations on the essential concepts of the present invention.

What is claimed is:

1. An improved fastening device for securing two timbers or the like together to form a single strength member, comprising
    a hollow bolt means having external oppositely-directed threads on each end and a non-threaded center section adapted to receive and rotatably engage a turning means inserted therein through one of said ends of said bolt means,
    said bolt means further being resiliently compressible to be inserted into a pre-drilled hole in one of said timbers smaller in diameter than the normal diameter of said bolt means.

2. The fastening devices described in claim 1, wherein said bolt means is provided with buttress-type threads on each of its ends.

3. The fastening device described in claim 2, wherein said bolt means is longitudinally split apart along its length.

4. The fastening device described in claim 3, wherein the edges of said bolt means confronting each other are each beveled but oppositely thereto,
    and wherein the edge which progresses when said bolt means is rotated to pull said timbers together tends to ride into and under the edge which trails during such rotation.

5. The fastening device described in claim 4, wherein said center section of said bolt means further includes an inwardly directed stop portion directed arcuately toward said trailing edge of said longitudinal split in said bolt means.

6. An improved fastening device for locking together two wooden timbers or the like, comprising
    a tubular member formed of metal and having two externally-threaded end portions separated by a non-threaded center section having an internal socket-like configuration,
    said tubular member being longitudinally split and further provided with a resiliently squeezable character, whereby said threaded end portions may be inserted into pre-drilled holes in said timbers smaller than the normal diameter of said threaded end portions.

7. The fastening device described in claim 6, wherein said tubular member is longitudinally split and radially and resiliently compressible for insertion into an aperture with a diameter smaller than the normal diameter of said tubular member.

8. An improved fastener for securing two timbers and the like together to form a strength member, comprising a compressible tubular bolt member having a divided sidewall and threads externally located on each end and oppositely directed for engaging and drawing together said timbers upon rotation of said bolt member therein, said bolt member further being resiliently compressible upon rotation in one direction in said timbers and resiliently expandable upon rotation in the opposite direction therein.

9. The fastener described in claim 8, wherein said bolt member is also compressible for slidable disposition at least partially into a pre-drilled hole in each of said timbers having a diameter smaller than the normal non-compressed diameter of said bolt member.

10. The fastener described in claim 9, wherein said bolt member has a longitudinal split along one side for providing two confronting edges resiliently spaced apart and compressible together by rotation of said bolt member in said one direction in said holes in said timbers.

11. The fastener described in claim 10, wherein said spaced apart edges are oppositely beveled whereby rotation of said bolt member in said one direction drives the leading one of said edges to and under the trailing one of said edges to compress said bolt member within said holes in said timbers.

* * * * *